(12) United States Patent
Keedwell et al.

(10) Patent No.: US 11,498,183 B2
(45) Date of Patent: Nov. 15, 2022

(54) AUTOMATED PEENING

(71) Applicant: ROLLS-ROYCE plc, London (GB)

(72) Inventors: Max B. Keedwell, Bristol (GB); Diego A. Pena Castillo, Bristol (GB)

(73) Assignee: Rolls-Royce PLC, London (GB)

(*) Notice: Subject to any disclaimer, the term of this patent is extended or adjusted under 35 U.S.C. 154(b) by 0 days.

(21) Appl. No.: 17/125,255

(22) Filed: Dec. 17, 2020

(65) Prior Publication Data
US 2021/0213588 A1 Jul. 15, 2021

(30) Foreign Application Priority Data
Jan. 10, 2020 (GB) .................................. 2000338

(51) Int. Cl.
B23P 9/04 (2006.01)
B24B 51/00 (2006.01)
B23Q 15/007 (2006.01)
B24B 39/00 (2006.01)
G05B 19/19 (2006.01)

(52) U.S. Cl.
CPC ................ B24B 51/00 (2013.01); B23P 9/04 (2013.01); B23Q 15/007 (2013.01); B24B 39/006 (2013.01); G05B 19/19 (2013.01); B23Q 2735/00 (2013.01)

(58) Field of Classification Search
CPC ......... B24B 51/00; B24B 39/006; B23P 9/04; B23Q 15/007; B23Q 2735/00; G05B 19/19; G05B 19/4103; G05B 2219/34118; G05B 2219/35122; B24C 1/10; B24C 3/18
See application file for complete search history.

(56) References Cited

U.S. PATENT DOCUMENTS 5,338,915 A * 8/1994 Hildebrand ............ B23K 26/04
219/121.61
7,467,449 B1 * 12/2008 Lee ........................ B23B 39/08
408/67

(Continued)

FOREIGN PATENT DOCUMENTS

CN 108285971 A 7/2018
EP 0536625 A1 4/1993

(Continued)

OTHER PUBLICATIONS

Great Britain search report issued in GB Patent Application No. 2000338.0 dated Jun. 22, 2020.

(Continued)

Primary Examiner — Jun S Yoo
(74) Attorney, Agent, or Firm — Shumaker & Sieffert, P.A.

(57) ABSTRACT

An automated peening method comprising: providing, adjacent a surface of a workpiece, a robotic arm having a peening tool attached thereto; defining a peening area of the surface of the workpiece; calculating a peening path for the peening tool over the peening area, the peening path substantially covering the peening area and comprising a sequence of movement patterns, wherein a geometric variable of one or more of the movement patterns is modified using an output of a random number generator; and controlling the robotic arm to move the peening tool over the surface of the workpiece to follow the peening path.

10 Claims, 3 Drawing Sheets

(56) References Cited

U.S. PATENT DOCUMENTS

| | | | |
|---|---|---|---|
| 7,954,348 B2* | 6/2011 | Forgues | ............... B24B 39/006 |
| | | | 451/466 |
| 2010/0018272 A1 | 1/2010 | Forgues et al. | |
| 2014/0007394 A1 | 1/2014 | Haas et al. | |
| 2018/0203432 A1* | 7/2018 | Walker | ............... G05B 19/4099 |

FOREIGN PATENT DOCUMENTS

| | | |
|---|---|---|
| EP | 1410873 A2 | 4/2004 |
| GB | 2452091 A | 2/2009 |
| JP | 2011189479 A | 9/2011 |
| WO | 2018015529 A1 | 1/2018 |

OTHER PUBLICATIONS

European search report dated May 6, 2021, issued in EP Patent Application No. 20214851.

Response to Extended Search Report dated May 19, 2021, from counterpart European Application No. 20214851.6 filed Dec. 23, 2021, 33 pp.

* cited by examiner

AUTOMATED PEENING

CROSS-REFERENCE TO RELATED APPLICATIONS

This specification is based upon and claims the benefit of priority from United Kingdom patent application number GB 2000338.0 filed on Jan. 10, 2020, the entire contents of which are incorporated herein by reference.

BACKGROUND

Technical Field

The present disclosure relates to an automated peening method, and a non-transitory computer readable medium comprising instructions which, when executed by a controller of a robotic arm, cause performance of an automated peening method. The present disclosure also relates to a controller for a robotic arm, and an automated peening system comprising a controller and a robotic arm.

Description of the Related Art

Peening techniques are commonly used in the aerospace industry to form components, or to improve the material properties of components.

Peening techniques used for the correction or flattening of distorted components (e.g. flapper peening) are generally performed manually. For example, in a flapper peening process an operator holds a flapper peening tool and applies the tool to the area of the component to be peened.

Such prior art peening methods have the drawback that they rely on the skills of a human operator. As a result, repeatability and consistency are low, and the training of human operators incurs training and labour costs.

SUMMARY

According to a first aspect there is provided an automated peening method comprising the steps of: providing, adjacent a surface of a workpiece, a robotic arm having a peening tool attached thereto; defining a peening area of the surface of the workpiece; calculating a peening path for the peening tool over the peening area, the peening path substantially covering the peening area and comprising a sequence of movement patterns, wherein a geometric variable of one or more of the movement patterns is modified using an output of a random number generator; and controlling the robotic arm to move the peening tool over the surface of the workpiece to follow the peening path.

Optionally, the method further comprises: indicating a point on the surface of the workpiece; centering the peening area on the indicated point; and setting an initial peening point based on the indicated point.

Optionally, the step of indicating a point on the surface of the workpiece comprises directing a point of laser light onto the surface of the workpiece.

Optionally, the peening path comprises multiple returning passes over the surface, each returning pass comprising a forward section corresponding to cumulative travel of the peening tool along a first vector over the surface, and a return section corresponding to cumulative travel of the peening tool along a second vector over the surface, the second vector being opposite the first vector.

Optionally, the forward section comprises a repeating sequence of a first movement pattern and the return section comprises a repeating sequence of a second movement pattern.

Optionally, the second movement pattern corresponds to the first movement pattern inverted about an axis parallel to the first and second vectors.

Optionally, one or more of the movement patterns comprises a spiral.

Optionally, each movement pattern comprises one or more legs extending between waypoints, wherein the geometric variable is a linear displacement between a waypoint of the movement pattern and a preceding waypoint of the movement pattern, or of a previous movement pattern.

Optionally, each movement pattern comprises one or more legs, wherein the geometrical variable is a radius of curvature of a curved leg.

Optionally, the peening tool is a flapper peening tool or a spiker peening tool.

According to a second aspect there is provided a non-transitory computer readable medium comprising instructions which, when executed by a controller of a robotic arm having a peening tool attached thereto, cause performance of the automated penning method in accordance with the first aspect.

According to a third aspect there is provided a controller for controlling a robotic arm, the controller configured to: define a peening area of a surface of a workpiece; and calculate a peening path over the peening area, wherein the peening path substantially covers the peening area and comprises a sequence of movement patterns, wherein a geometric variable of one or more of the movement patterns is modified using an output of a random number generator.

Optionally, the controller is further configured to: receive an indication of a point on the surface of the workpiece; center the peening area on the indicated point; and set an initial peening point based on the indicated point.

Optionally, receiving an indication of a point on the surface of the workpiece comprises detecting a point of laser light onto the surface of the workpiece.

Optionally, the peening path comprises multiple returning passes over the surface, each returning pass comprising a forward section corresponding to cumulative travel of the robotic arm along a first vector over the surface and a return section corresponding to cumulative travel of the robotic arm along a second vector over the surface, the second vector being opposite the first vector.

Optionally, the forward section comprises a repeating sequence of a first movement pattern and the return section comprises a repeating sequence of a second movement pattern.

Optionally, the second movement pattern corresponds to the first movement pattern inverted about an axis parallel to the first and second vectors.

Optionally, one or more of the movement patterns comprises a spiral.

According to a fourth aspect there is provided a system comprising: the controller according to the third aspect; and a robotic arm having a peening tool attached thereto.

Optionally, the peening tool is flapper peening tool or a spiker peening tool.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
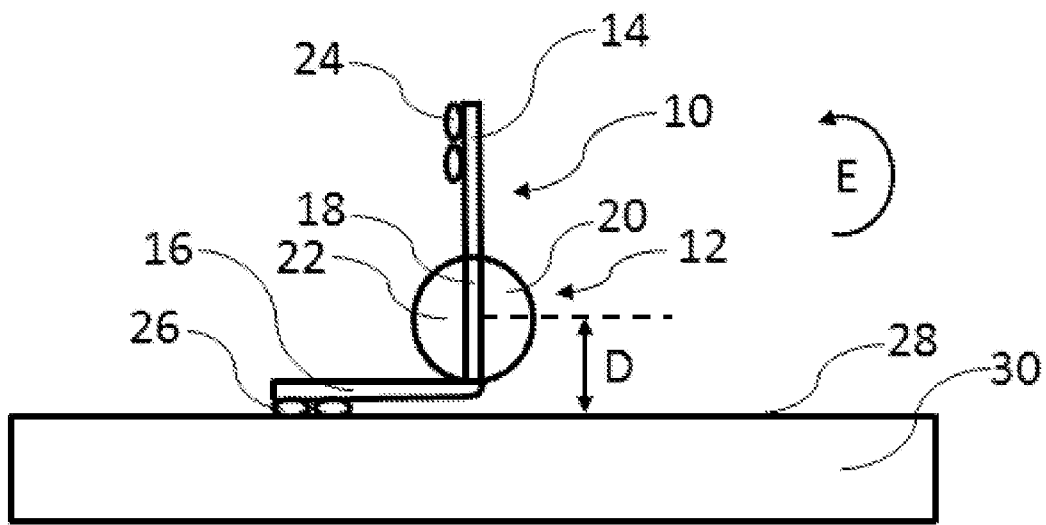
FIG. 1 schematically shows a flapper peening tool suitable for use in a method of the present invention.

FIG. 1 schematically shows a cross-sectional view of a flapper peening tool. A shot bonded flap 10 is attached to a mandrel 12. The flap 10 comprises a pair of flexible flaps 14, 16 (e.g. made from polymeric material) connected by an intermediate adhesive section 18. To attach the flap 10 to the mandrel 12, the adhesive section 18 is clamped between two portions 20, 22 of the mandrel 12.

In use, the mandrel 12 rotates about an axis (orthogonal to the page in FIG. 1) in the direction indicated by arrow E (i.e. anticlockwise as shown in FIG. 1). Said rotation causes shot 24, 26 embedded in the flexible flaps 14, 16 to periodically impact a surface 28 of a workpiece 30 when provided in the path of the flaps. The shot 24, 26 is typically tungsten carbide shot, although other materials may be used.

The mandrel 12 is suspended over the surface 28 by a standoff distance D (measured from the surface 28 to the axis of rotation of the mandrel 12). The distance D is selected based on the configuration of the peening tool (e.g. the length of the flexible flaps 14, 16, the rotation speed of the mandrel 12, the mass of the shot) to result in a predetermined impact force.

In prior art flapper peening processes, the mandrel 12 is a mandrel of a hand-held flapper peening tool. A human operator moves the mandrel 12 over the surface 28 in two dimensions in a plane parallel to the surface 28 of the workpiece 30. To target a uniform intensity in the workpiece 30 over the area peened, the human operator needs to move the mandrel 12 in a continuous smooth motion in a plane parallel to the surface 28, while keeping the standoff distance D as constant as possible. If the human operator stops moving the mandrel 12, then one portion of the surface will be repeatedly impacted by the shot 24, 26 and overpeening will occur.

In methods according to the present disclosure, the mandrel 12 is part of a peening tool that is attached to a robotic arm, for example a robotic arm of an industrial robot or a collaborative robot, also known as a 'cobot'. The robotic arm may be configured to move in accordance with instructions received from a controller to carry out an automated peening method.

Figure 2:
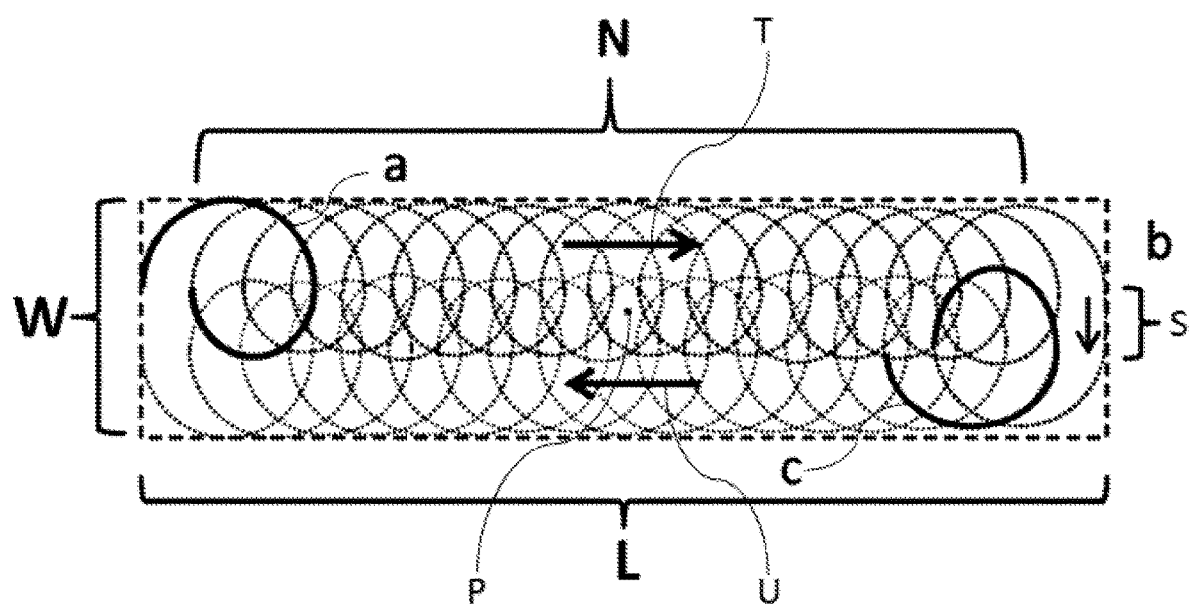
FIG. 2 schematically shows a returning pass of an exemplary peening path.

FIG. 2 schematically shows a top-down view of a first return pass of a peening path generated by a controller programmed in accordance with an embodiment of the invention.

To initialise the controller according to one example of the present invention, an operator indicates a central point P of a surface of a workpiece to be peened by directing a point of laser light on the surface, e.g. using a laser pointer. The controller comprises a camera, or other means of detecting a point of laser light. Once the controller detects the point of laser light, the controller sets the detected point as a centre point of the target peening area.

The operator inputs to the controller (for example, using a keyboard, or other suitable user interface) a length L along an x-direction and width W along a y-direction for the area of the surface to be peened. The controller sets the target peening area on the surface of the workpiece, such that a centre of the rectangle LW corresponds to the central point P.

An initial peening point is also set based on the central point P. In the example shown in FIG. 2, the initial peening point is set on the rectangle LW at a point corresponding to one extreme of the x-direction (i.e. x=0, or x=L), and at a suitable position along the y direction to start a spiral movement pattern in a respective corner of the peening area, as will be described in detail below. In other examples, alternative initial peening points may be used, e.g. a corner of the rectangle LW, or the central point P itself may be set as the initial peening point.

In variants of this example, the area of the surface to be peened may be defined in any suitable way. For example, an operator may mark a boundary of the area on the physical surface, and the controller may determine the peening area based on detecting the marked boundary (e.g. using a camera). In further examples, the area may be defined in a model of the component in any suitable way.

The operator may also input the type of peening tool that has been attached to the mandrel, or this may be detected by the controller based on a signal received from the tool. In response to this input, the controller may command the robotic arm to adopt an appropriate standoff distance for the type of peening tool selected (e.g. a standoff distance configured to impart a predetermined impact force based on the length of the flexible flaps 14, 16, where the peening tool is a flapper peening tool) In other examples, the operator may manually input a required standoff distance.

In the example shown in FIG. 2, the controller is configured to generate a path from three basic movement patterns: 'a', 'b' and 'c'. Movement pattern 'a' comprises a spiral, and is shown and described in more detail with respect to FIG. 3. Movement pattern 'b' comprises a partially elliptical movement that results in a linear displacement S in the direction of width W. Movement pattern 'c' comprises a spiral that is identical to movement pattern 'a', but inverted.

Based on the defined peening area, the controller calculates how many times N to repeat the movement patterns 'a' and 'c' to cover the length L in respective forward and return sections T, U. The controller also determines a number of forward and returning sections to perform in order to cover the width W, and the magnitude of the linear displacement S between the adjacent forward and return sections T, U to cover the width W. In this example, a returning pass comprising a single forward section and a single return section is shown as covering the entire width W for simplicity, although it will be appreciated that multiple such sections may be defined to cover a larger width.

In each returning pass, the forward section T leads away from the initial peening point and, following the linear displacement S, the return section U leads back toward the initial peening point. The sections T, S and U together comprise one returning pass over the area of the surface. The forward section T corresponds to cumulative travel of the peening tool along a first vector over the surface, and the return section U corresponds to cumulative travel of the peening tool along a second vector over the surface, the second vector being opposite the first vector.

The operator may also input a peening duration for the peening process. Greater peening durations result in a greater intensity in the peened workpiece according to an almen strip saturation curve, as is known in the art. The saturation curve for the controller and automated peening process can be derived using almen strip testing, so that an operator can input a duration to achieve a desired intensity, e.g, using a lookup table based on a previously-derived almen strip saturation curve. Alternatively, the operator may manually start and stop the peening process.

The controller is programmed to move the mandrel at a constant speed, and so the time taken to complete one pass is known. Once the peening duration has been input by a user, the controller calculates number of passes required to peen the surface for the peening duration input by dividing the peening duration by the time taken for a single pass over the surface, and calculates a peening path comprising the appropriate number of passes. Where the peening duration is not divisible by the time taken for a single pass to provide an integer number of passes, the controller may select a speed between maximum and minimum speed limits programmed into the controller in order to complete an integer number of passes within a specified duration.

For simplicity, only one pass is illustrated in FIG. 2. However, it should be noted that typically multiple passes will be required to fulfil the peening duration, and so typically a peening path will comprise multiple passes. Additionally, while the pass shown in FIG. 2 comprises a single forward section T and a single return section U with a single displacement S in the width direction W, it will be understood that for larger values of VV a single pass may comprise multiple forward and return sections, and multiple displacements in the width direction W as mentioned above.

Figure 3:
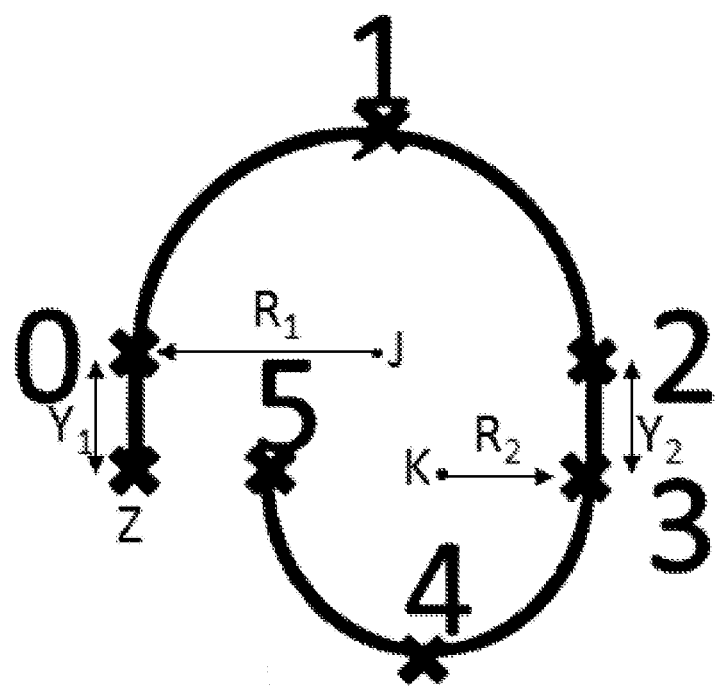
FIG. 3 schematically shows a detailed view of movement pattern 'a' of FIG. 2.

FIG. 3 schematically shows a detailed view of movement pattern 'a', one of the three movement patterns used in the example first pass of the exemplary peening path shown in FIG. 3. The movement pattern 'a' comprises a plurality of waypoints Z, 0, 1, 2, 3, 4, 5 joined by movements of the robotic arm holding the mandrel. The movements of the movement pattern are carried out as follows:

Waypoint Z is an initial waypoint. In the first movement pattern of the forward section T shown in FIG. 2, this point corresponds to the initial peening point. The mandrel is initially positioned at waypoint Z. The mandrel moves linearly by an amount $Y_1$ in the width direction from waypoint Z to waypoint 0.

From waypoint 0, the mandrel moves in a 90° clockwise rotation about a point J with constant radius $R_1$ to arrive at waypoint 1.

From waypoint 1, the mandrel moves in a further 90° clockwise rotation about point J with constant radius $R_1$ to arrive at waypoint 2. Equivalently, the mandrel can be said to move through a 180° arc of radius $R_1$ from waypoint 0 to waypoint 2

From waypoint 2, the mandrel moves linearly by an amount $Y_2$ in the width direction to arrive at waypoint 3.

From waypoint 3, the mandrel moves in a 90° clockwise rotation about a point K with constant radius $R_2$ to arrive at waypoint 4.

From waypoint 4, the mandrel moves in a further 90° clockwise rotation about point K with constant radius $R_2$ to arrive at waypoint 5. Equivalently, the mandrel can be said to move through a 180° arc of Radius $R_2$ from waypoint 3 to waypoint 5.

At waypoint 5, the current waypoint is redefined as initial waypoint Z for the next movement pattern a, and the process is repeated.

To ensure that the movements form a spiral movement pattern, $R_2$ is less than $R_1$, and all of the rotations are in the same direction (e.g. clockwise).

It should be noted that in this example the movements between the waypoints represent translational movement of the mandrel only. That is, the axis of rotation of the mandrel maintains a constant orientation with respect to the workpiece, and does not rotate around the points J and K. In the example shown in FIG. 2, the axis of rotation of the mandrel is always parallel to the length direction L.

As shown in FIG. 2, when the movement pattern 'a' has been repeated N times, the forward section T of the path is completed. At this point, movement pattern 'b' is carried out in order to move the initial point Z by a displacement S in the width direction W. Following this, the return section U of the path is initiated.

In the return section U, movement pattern 'c' (which corresponds to movement pattern 'a' inverted about an axis parallel to the forward section T and the return section U) is repeated N times. This completes one returning pass over the area of the surface to be peened.

It has been found that moving the mandrel over the surface to be peened in the same pattern in successive passes results in patternisation, or a 'strobing' effect, in which areas of the surface lying on the pattern are peened repeatedly. This results in overpeening of some areas of the surface. Visually, this can give the appearance that a pattern has been etched into the surface to be peened. This is undesirable, as the peening process preferably results in uniform peening, and hence uniform intensity, over the entire target peening surface of the workpiece.

In order to counteract this effect, a degree of randomisation can be introduced into the calculation of the peening path by using a path-generating algorithm that incorporates a random number generator (RNG). In the example shown in FIGS. 2 and 3, a random number generator is used when determining the distance $Y_1$ between the initial waypoint Z and waypoint 0. For example, there may be a baseline value (e.g. 3 mm) for the distance $Y_1$. The random number generator may be used to return a modification number between zero and one. This modification number can then be multiplied by the baseline value or a fraction of the baseline value to determine the distance $Y_1$.

For example, for one movement pattern in the forward section T, the random number generator may return a value of 0.5. This would result in a distance $Y_1$ between waypoint Z and waypoint 0 of 0.5×3 mm=1.5 mm. In another movement pattern in the forward section T, the random number generator may return a value of 0.25. This would result in a distance between waypoint Z and waypoint 0 of 0.25×3 mm=0.75 mm.

The baseline value and modification number can be set so that the peening path does not go outside the rectangle LW.

A random number generator can similarly be used when determining the distance $Y_2$ between waypoint 2 and waypoint 3, for some or all of the movement patterns in a given section.

By varying the amount of displacement $Y_1$ and/or $Y_2$ in the movement pattern, each of the N movement patterns in the forward and return sections T, U can be uniquely formed. Consequently, in successive passes over the surface the mandrel will not peen exactly the same points on the surface as in a previous pass. This results in a greater uniformity in peening compared to prior art peening methods.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, while the amounts of linear displacement $Y_1$ and/or $Y_2$ are varied in the example shown in FIGS. 2 and 3, the movement pattern could also be varied by randomly varying one of the radii $R_1$ and $R_2$ for one or more of the respective arcs between waypoints. In some examples, one or both radii could be varied, or a combination of variable linear displacements and radii could be implemented. However, examples in which only the linear displacements $Y_1$ and $Y_2$ are varied are thought to be particularly advantageous, because the distance in the length direction L between successive movement patterns is not affected by the randomisation. Therefore, the number of movement patterns N to fill a given length L can be easily calculated.

While the peening method has been described using a flapper peener, the path generation algorithm disclosed herein could also be used for other types of peener. For example, a spiker peener (comprising a reciprocating point of shot) could be attached to the arm of a cobot and moved over a surface of a workpiece using a path generated in accordance with the present disclosure.

In some examples, the successive movement patterns of the forward and return sections could be identical to each other (i.e. unmodified), but the initial peening position for each pass over the surface could be modified in position (either in the length direction or width direction) using a random number generator.

While the operator inputs length and width dimensions in the example shown, the desired target area could instead be indicated using any other suitable method. For example, a target area could be specified using a central point and a radius dimension, with the target area being set as a circle centered on the central point. In other examples, a number of pre-set target areas could be stored in a memory of the controller for selection by an operator.

In some examples, the controller could include a 'free-running' mode, in which the target area is specified based on the reach of the robotic arm. In the free-running mode the target peening area is defined by the controller to correspond to the maximum effective peening area of the robotic arm, which may correspond either to the physical limitations of the robotic arm itself (i.e. the furthest points that the robotic arm can reach with the peening tool, while still remaining the standoff distance D over the surface of the workpiece), or distance limits (e.g. safety limits) that are hardwired into the robotic arm. In this mode an operator may simply place a workpiece within the effective peening area and specify a peening duration. This mode may be suitable for use where many similar workpieces are to be peened one after another. To ensure repeatability, a jig may be provided so that the workpiece is reliably placed in the same position with respect to the robotic arm.

While the example described above with respect to FIG. 2 uses spiral movement patterns, any movement pattern could be used in practice, provided a degree of randomisation is introduced to at least one geometric variable of a movement pattern in each pass in order to ensure that the robotic arm does not peen following two aligned patterns in successive passes. Examples include a raster scan over the peening area (e.g. with a randomised initial peening point on each pass), or a Hilbert curve. However, geometric shapes using curves are generally preferred, as these have been found to avoid hard edges between peened and non-peened areas at a border of the target peening area.

We claim:
1. An automated peening method comprising the steps of:
   providing, adjacent a surface of a workpiece, a robotic arm having a peening tool attached thereto;
   defining a peening area of the surface of the workpiece;
   calculating a peening path for the peening tool over the peening area, the peening path substantially covering the peening area and comprising a sequence of movement patterns, wherein a geometric variable of one or more of the movement patterns is modified using an output of a random number generator, wherein each movement pattern comprises one or more legs, wherein the geometrical variable of a curved leg of the one or more legs modified using the output of the random number generator is a radius of curvature; and
   controlling the robotic arm to move the peening tool over the surface of the workpiece to follow the peening path.

2. The automated peening method according to claim 1, further comprising:
   indicating a point on the surface of the workpiece;
   centering the peening area on the indicated point; and
   setting an initial peening point based on the indicated point.

3. The automated peening method according to claim 2, wherein the step of indicating a point on the surface of the workpiece comprises directing a point of laser light onto the surface of the workpiece.

4. The automated peening method according to claim 2, wherein the peening path comprises multiple returning passes over the surface, each returning pass comprising a forward section corresponding to cumulative travel of the peening tool along a first vector over the surface, and a return section corresponding to cumulative travel of the peening tool along a second vector over the surface, the second vector being opposite the first vector.

5. The automated peening method according to claim 4, wherein the forward section comprises a repeating sequence of a first movement pattern and the return section comprises a repeating sequence of a second movement pattern.

6. The automated peening method according to claim 5, wherein the second movement pattern corresponds to the first movement pattern inverted about an axis parallel to the first and second vectors.

7. The automated peening method according to claim 1, wherein one or more of the movement patterns comprises a spiral.

8. The automated peening method according to claim 1, wherein the curved leg of the one or more legs is a first leg of the one or more legs, wherein the geometric variable of a second leg of the one or more legs modified using the output of the random number generator is a linear displacement between a waypoint of the movement pattern and a preceding waypoint of the movement pattern, or of a previous movement pattern.

9. The automated peening method according to claim 1, wherein the peening tool is a flapper peening tool or a needle peening tool.

10. A non-transitory computer readable medium comprising instructions which, when executed by a controller of a robotic arm having a peening tool attached thereto, cause performance of an automated peening method comprising the steps of:

providing, adjacent a surface of a workpiece, a robotic arm having a peening tool attached thereto;

defining a peening area of the surface of the workpiece;

calculating a peening path for the peening tool over the peening area, the peening path substantially covering the peening area and comprising a sequence of movement patterns, wherein a geometric variable of one or more of the movement patterns is modified using an output of a random number generator, wherein each movement pattern comprises one or more legs, wherein the geometrical variable is a radius of curvature of a curved leg; and controlling the robotic arm to move the peening tool over the surface of the workpiece to follow the peening path.

* * * * *